United States Patent

Fines et al.

[11] Patent Number: 5,974,094
[45] Date of Patent: Oct. 26, 1999

[54] FFT RECEIVER FOR MFSK

[75] Inventors: Panagiotis Fines; Siu Wah Wong, both of London, United Kingdom

[73] Assignee: Inmarsat Limited, United Kingdom

[21] Appl. No.: 08/930,699

[22] PCT Filed: Apr. 11, 1996

[86] PCT No.: PCT/GB96/00891

§ 371 Date: Dec. 17, 1997

§ 102(e) Date: Dec. 17, 1997

[87] PCT Pub. No.: WO96/32797

PCT Pub. Date: Oct. 17, 1996

[30] Foreign Application Priority Data

Apr. 11, 1995 [GB] United Kingdom ............... 9507508

[51] Int. Cl.⁶ .................................................. H04L 27/14
[52] U.S. Cl. .......................................................... 375/335
[58] Field of Search ................................... 375/335, 334, 375/336, 337, 323, 343, 272, 275; 329/300, 302; 340/825.58; 341/181

[56] References Cited

U.S. PATENT DOCUMENTS

| 5,005,209 | 4/1991 | Kung et al. ............................. 375/335 |
| 5,023,889 | 6/1991 | Divsalar et al. ........................ 375/280 |
| 5,365,470 | 11/1994 | Smith . | |
| 5,557,637 | 9/1996 | Glynn ..................................... 375/335 |

FOREIGN PATENT DOCUMENTS

| A-0142427 | 5/1985 | European Pat. Off. . |
| A-0204420 | 12/1986 | European Pat. Off. . |
| C-4234336 | 10/1993 | Germany . |
| A-2180377 | 3/1987 | United Kingdom . |

OTHER PUBLICATIONS

IEEE Transactions On Communication Technology, vol. COM–16, No. 5, Oct. 1968, New York US, pp. 657–668, XP002011456 Ferguson: Communication at low data rates—spectral analysis receiver.

Chan & Couture: "Comparison of two FFT–based demodulation schemes for M–ary FSK", New York, US, pp. 603–607, XP00346661, Oct. 1992.

Vargauzin: Use of fast Fourier transform for realization of programmable digital demodulators, Telecommunications And Radio Engineering, vol. 46, No. 11, New York, US, pp. 80–82, XP00311105, Nov. 1991.

*Primary Examiner*—Stephen Chin
*Assistant Examiner*—Albert Park
*Attorney, Agent, or Firm*—Banner & Witcoff, Ltd.

[57] ABSTRACT

Data is transmitted in a signal comprising a data signal $D_m$ at a frequency within a range B of discrete frequency tones $D_0$ to $D_{m-1}$ representing a predetermined range of digital values, and a pilot signal (36, 37). The signal is received by a circuit comprising a transformer (44 to 54) which transforms the received signal into a set of frequency samples of the pilot signal and a set of frequency samples of the data signal. The samples are input to a correlator (58) which correlates the set of frequency samples of the pilot signal with the set of frequency samples of the data signal at each of the discrete frequency tones in order to identify the discrete frequency tone to which the frequency of the data signal corresponds. In this way, the digital value represented by the data signal can be identified. The circuit is suitable for use in a radio pager for receiving data signal transmissions from a distant source which may be transmitted from a satellite.

35 Claims, 3 Drawing Sheets

FFT RECEIVER FOR MFSK

The invention relates to an electronic circuit for and a method of decoding a signal. More specifically the invention relates to an electronic circuit for and a method of decoding a signal comprising a data signal at a frequency within a range of discrete frequency slots representing a predetermined range of digital values and a pilot signal. The circuit and method are suitable for use in data transmission systems where data is transmitted at a slow rate as well as in systems where data is transmitted at a high rate.

In paging systems generally data is transmitted at a slow rate. There are problems associated with such low data transmission rates, especially if the receiving pager is moving. FIG. 1 of the accompanying drawings illustrates a situation where a pager (not shown) in a vehicle 1 is moving at velocity v past two buildings 2, 3. At time t=0 the vehicle 1 is in a position where there is a clear line of sight to a source (e.g. a satellite) and signals from the source arrive at the vehicle 1 at an angle of incidence $\theta$. Because the vehicle is moving the frequency of the arriving signal is subjected to a doppler shift $\Delta f=-v/c\cos\theta$. At time t=1 the vehicle has moved to a position 1' where the building 2 obscures the source and the signal is reflected from the building 3 before arriving at the vehicle 1'. Thus, at time t=1 the frequency of the arriving signal is subjected to a doppler shift $\Delta f=v/c\cos\theta$.

In data transmission systems, digital data is often transmitted using frequency shift keying (FSK) techniques. In m-ary FSK transmission a frequency range is divided into a number m of discrete frequency tones each representing a respective different digital value. Digital data is transmitted by transmitting on a carrier signal a tone for a predetermined period of time at the frequency corresponding to the value of the data. FIG. 2 of the accompanying drawings shows the frequency spectrum of a 32-ary FSK transmission system in which a signal 4 is being transmitted at a frequency corresponding to the data value $D_{16}$. The effect of doppler shift on the transmitted signal 4 is shown in FIG. 3 of the accompanying drawings. At time t=0 (when the vehicle is at position 1) the received signal 4' is shifted down to a frequency somewhere between the frequencies corresponding to the data values $D_{15}$ and $D_{16}$. At time t=1 the received signal 4" is shifted up to a frequency somewhere between the frequencies corresponding to the data values $D_{16}$ and $D_{17}$.

In densely populated urban areas the problem is made worse by multiple reflections of the signal which results in multipath reception of the signal. This can cause frequency smearing, such as illustrated in FIG. 4 of the accompanying drawings, when the receiver is moving. Multipath reception also causes multiple peaks over a few frequency tones, such as illustrated in FIG. 5 of the accompanying drawings, when the receiver is moving. Multipath effects can be so bad that the amplitude of the signal is reduced to noise levels in which case the signal will be lost.

One method that has been proposed for overcoming the effects of doppler/multipath signal degradation is to apply a differential encoding to the data. That is to say, the present data is transmitted as the difference from the previously transmitted data. The advantage of this method is that all signals are doppler shifted by the same amount and (assuming there is a clear line of sight to the source) the doppler effects are therefore cancelled out. However, the method is not suitable for eliminating multipath effects because it is unable to compensate for errors which are introduced to the received signal each time there is a path change.

Another method proposed for overcoming the aforementioned problems is a technique in which data is transmitted together with a known tone, i.e. a reference frequency, which is transmitted between data from time to time. FIG. 6 of the accompanying drawings illustrates a signal 5 comprising a sequence of data tones 6 to 12. During transmission of the signal 5 every third tone (say) is a known tone 8, 11. At the receiver the signal is decoded to remove the known tones which are used to ensure that the correct data is decoded from the signal. The insertion of a known tone in the data stream creates an overhead in the transmission. That is to say, time is spent transmitting the known tone which in itself does not carry any data. Nevertheless, this method is suitable for use in systems where data is transmitted at a high rate. It is less suitable for systems with slower data rates because as the rate is reduced the overhead, in terms of the number of known tones that must be inserted into the signal as compared with the number of data tones, increases.

Doppler effects in m-ary FSK data transmissions can be reduced by transmitting with the data signal (tone) a pilot signal. This technique is known as pilot aided m-ary FSK transmission or m-PFSK transmission. FIG. 7 of the accompanying drawings illustrates an m-PFSK scheme in which a range of m discrete frequency tones 13 to 20 separated by a spacing frequency $f_s$ occupy a frequency range or bandwidth B. At a frequency $f_p$ above the highest frequency of the bandwidth B a pilot signal 21 is transmitted. The frequency of the pilot signal 21 is selected so that the pilot signal 21 will be subjected to substantially the same effects as the data signal. In this way the pilot signal will be subject to the same frequency shifts, smears and scattering as the data signal. The pilot signal can thus be used as a reference to enable the data signal to be correctly decoded.

Hitherto the decoding of received m-PFSK signals has been by way of a circuit based around a phase-locked loop (PLL). As shown in FIG. 8 of the accompanying drawings an incoming received signal, comprising a carrier modulated by the data signal and the pilot signal, is input to a PLL 22 and to a demodulator 23. The PLL 22 is locked on to the phase of the pilot signal 21 and produces a reference signal which is used by the demodulator 23 to demodulate the received signal and thereby extract the data signals therefrom. PLL-based circuits are widely used to decode m-PFSK signals and are generally acceptable in terms of accuracy and reliability. However, a PLL-based circuit depends on the PLL successfully phase-locking onto the pilot signal. In a mobile receiver, as the received signal fades or the pilot phase fluctuates rapidly, the PLL will be driven out of lock. The PLL will remain out of lock for some time, depending on the response of the loop, even after the received signal has become free from disturbances.

Phase error fluctuations in the pilot will also disturb demodulation when the PLL remains locked, resulting in a further loss of performance.

In satellite paging systems data may be transmitted at very low rates, for example 20 bits per second, because this has been found to give the optimum trade off between such factors as the length of time that the satellite is in use, reliability and of course cost. The aforementioned problems tend to be greater in satellite paging because of the low data rates and the distances involved in transmitting the data. Received signals tend to be relatively weak in any case and when the receiver is moving in a densely populated urban area the strength of the received signal can fall to that of the background noise, making clear reception and error free decoding difficult if not impossible.

The present invention aims to overcome at least some of the aforementioned problems and limitations.

According to one aspect of the invention there is provided an electronic circuit comprising: a receiver for receiving a signal comprising a data signal at a frequency within a range of discrete frequency tones representing a predetermined range of digital values and a pilot signal; a transformer for transforming the received signal into a set of frequency samples of the pilot signal and a set of frequency samples of the data signal; and a correlator for correlating the set of frequency samples of the pilot signal with the set of frequency samples of the data signal at each of the discrete frequency tones in order to identify the discrete frequency tone to which the frequency of the data signal corresponds and thereby to identify the digital value represented by the data signal.

The electronic circuit may be incorporated into a radio pager for receiving data signal transmissions from a distant source which may be a satellite.

According to another aspect of the invention there is provided a method of decoding a signal comprising a data signal at a frequency within a range of discrete frequency tones representing a predetermined range of digital values and a pilot signal, the method comprising: transforming the signal into a set of frequency samples of the pilot signal and a set of frequency samples of the data signal; and correlating the set of frequency samples of the pilot signal with the set of frequency samples of the data signal at each of the discrete frequency tones in order to identify the discrete frequency tone to which the frequency of the data signal corresponds and thereby to identify the digital value represented by the data signal.

The invention extends to a method of paging in which paging data is broadcast as a broadcast signal comprising a data signal at a frequency within a range of discrete frequency tones representing a predetermined range of digital values and at least one pilot signal, and in which the broadcast data received by paging units is decoded using the aforementioned method.

The above and further features of the invention are set forth with particularity in the appended claims and together with advantages thereof will become clearer from consideration of the following detailed description of an exemplary embodiment of the invention given with reference to the accompanying drawings.

Figure 1:
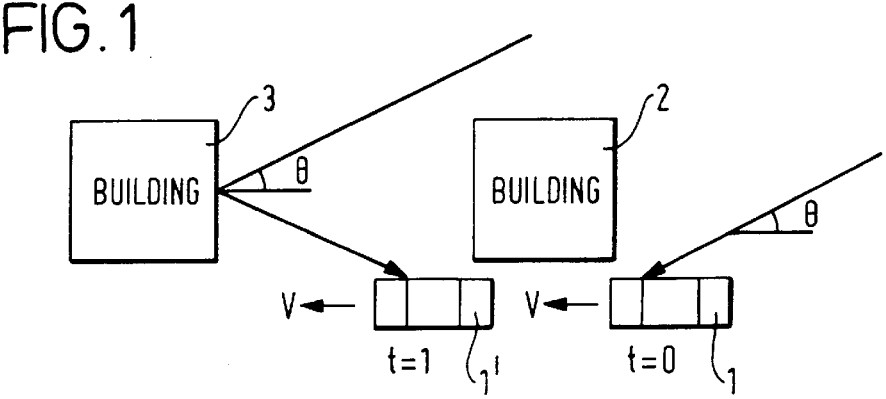
FIG. 1 is a schematic plan view of a moving vehicle receiving a signal in the proximity of buildings.
Figure 2:
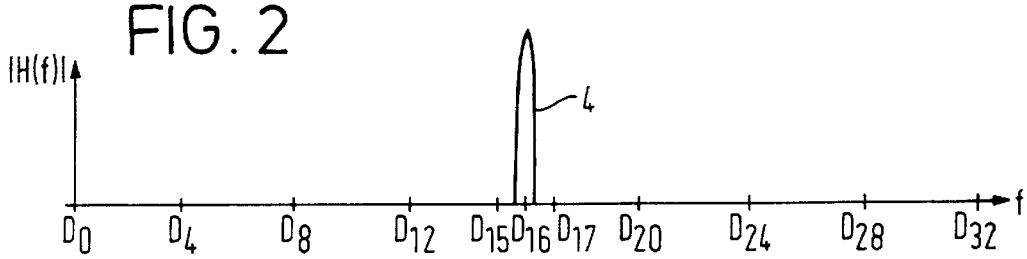
FIG. 2 is an m-ary FSK spectrum including a transmitted signal.
Figure 3:
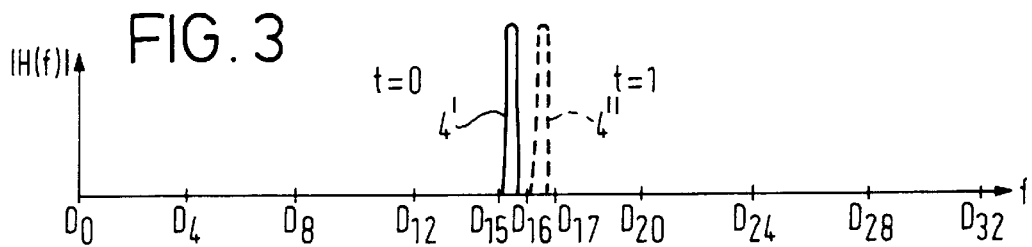
FIG. 3 is the m-ary FSK spectrum in which the transmitted signal is subjected to doppler effects.
Figure 4:
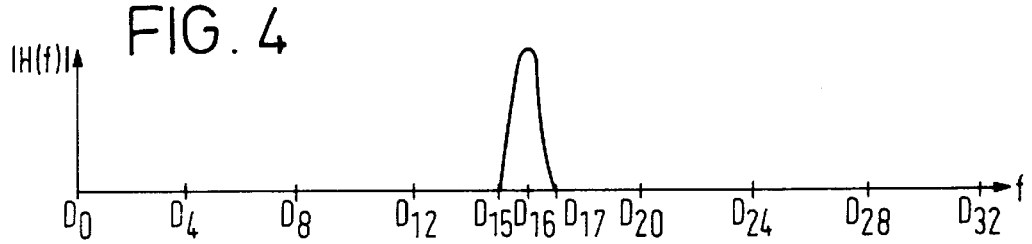
FIG. 4 is the m-ary FSK spectrum in which the transmitted signal is subjected to frequency smearing.
Figure 5:
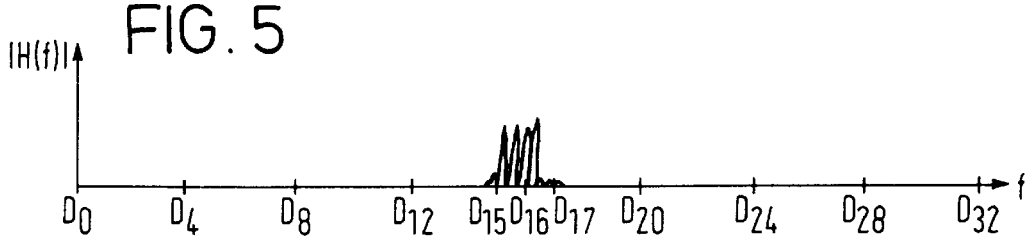
FIG. 5 is the m-ary FSK spectrum in which the transmitted signal is subjected to multipath frequency smearing and doppler effects.
Figure 6:
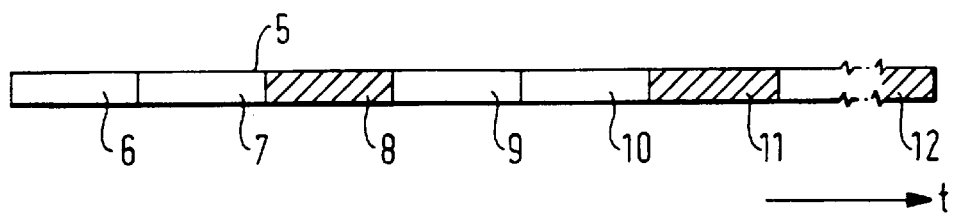
FIG. 6 is a schematic representation of known tones inserted in a transmitted signal.
Figure 7:
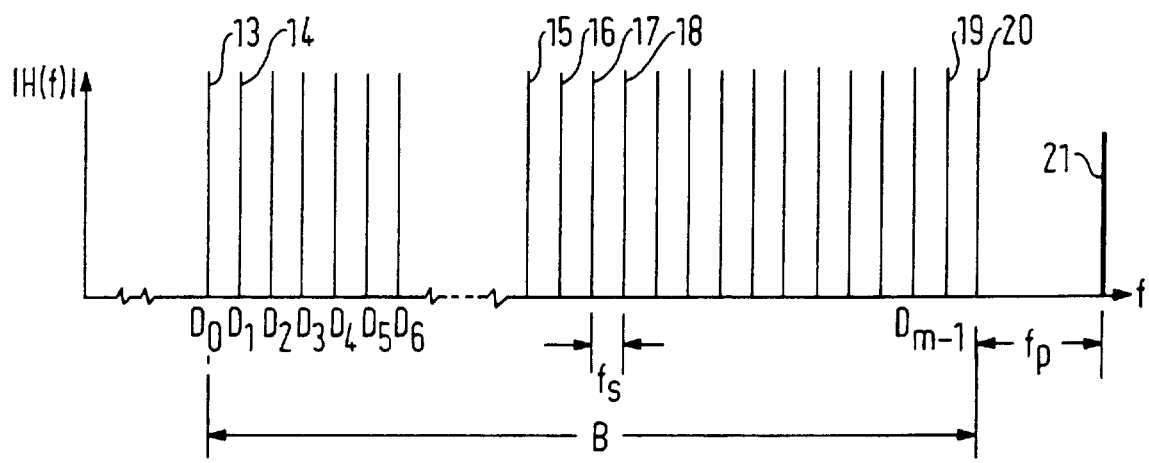
FIG. 7 is an m-PFSK spectrum.
Figure 8:
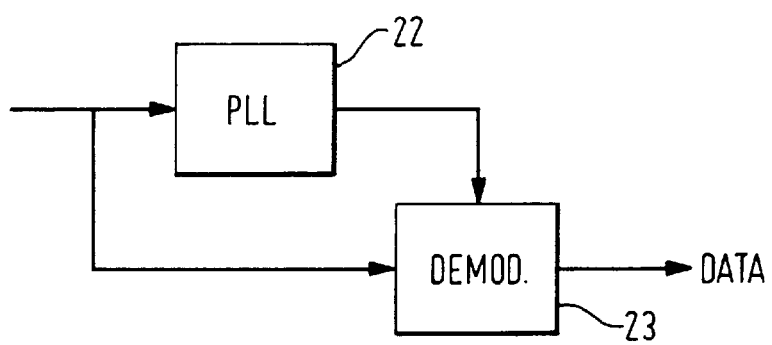
FIG. 8 is a schematic system diagram of an m-PFSK receiver.
Figure 9:
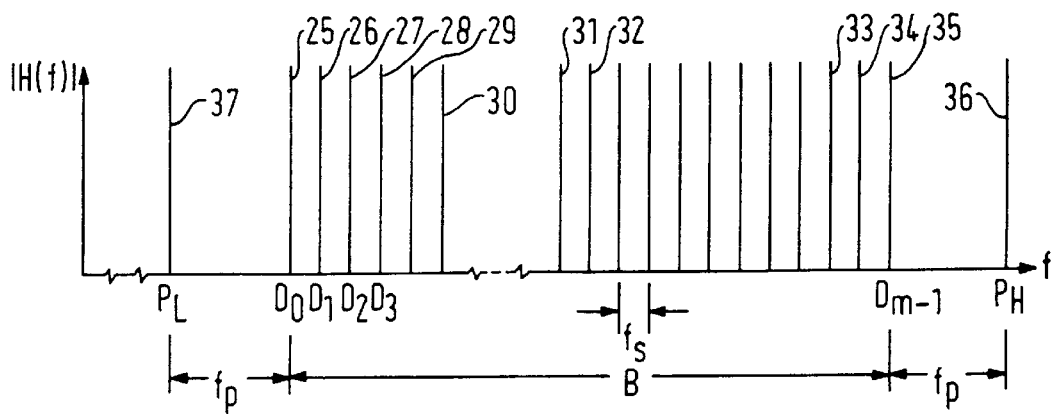
FIG. 9 is an m-PFSK spectrum comprising two pilot signals.

Turning now to FIG. 9 of the accompanying drawings there is shown an m-PFSK transmission spectrum comprising a range of m discrete frequency slots or tones ($D_0$ to $D_{m-1}$) 25 to 35 separated from one another by a spacing frequency $f_s$ and all lying within a frequency range or bandwidth B. A high pilot signal $p_H$ 36 has a frequency or tone spaced by a frequency $f_p$ above the highest frequency ($D_{m-1}$) of the bandwidth B. A low pilot signal $P_L$ 37 has a frequency or tone spaced by a frequency $f_p$ below the lowest frequency ($D_0$) of the bandwidth B. Data is transmitted from a source by modulating a carrier (not shown) with a data signal $D_m$ at one of the tones m 25 to 35 within the bandwidth B and with both of the pilot signals 36, 37. Although two pilot signals 36, 37 are shown it will be appreciated from the description that follows that only one pilot signal is necessary, in which case the transmission spectrum may be the same as that previously discussed and shown in FIG. 7 of the drawings.

In an alternative arrangement (not shown) a gap of 2 $f_p$ may be created in the spectrum between two adjacent tones $D_n$ and $D_{n+1}$ and the pilot signal may be used having a frequency $f_p$ above the frequency of the tone $D_n$. In the case of plural pilot signals, plural gaps may be similarly created in the spectrum to accommodate the plural pilot signals. Whether the pilot signal or signals are at respective frequencies within or without the frequency range B is a matter of design choice.

There are several advantages in using an m-PFSK transmission scheme, as compared to the more conventional m-FSK scheme. Firstly, the presence of at least one pilot signal means that frequency or tone spacing ($f_s$) can be relatively small (e.g. 20 Hz) as compared with the spacing required in an m-FSK scheme. This means that in a given bandwidth more data can be transmitted or that for a given amount of data a smaller bandwidth is required. Secondly, no known tone is needed and there is therefore no overhead in accommodating known non-data carrying signals (e.g. tones) in the transmitted signals. The pilot signal provides a reference against which the frequency of the data signal can be determined. Thirdly, there is no error floor and performance increases continuously with transmitted power. That is to say, there is no minimum bit error rate below which improvements in the signal to noise ratio (SNR) will have no effect. Instead, the bit error rate will fall to zero as the SNR is increased. Fourthly, performance increases with increases in fading rate because the data signal energy increases by the space diversity provided by an antenna installed on a fast moving vehicle. In other words, the fading rate of the received signal will increase as the speed of the vehicle increases. The duration of each fade, however, decreases and consequently the received signal is lost for shorter periods of time and is stronger for longer periods of time, thereby reducing the number of errors in the received data. Conventional m-FSK cannot make use of this extra energy and consequently its performance reduces as the fading rate increases.

As will be described in greater detail hereinbelow, the data in the received signal is extracted by signal processing. In order to simplify the complex mathematics the m-PFSK signal is constructed subject to the following conditions. Firstly, the frequency slots $D_0$ to $D_{m-1}$ are selected so that in the frequency spectrum of the transmitted m-PFSK signal the peak of one slot, say $D_8$, coincides with the zeros of its adjacent slots, say $D_7$ and $D_9$. This is achieved by selecting the spacing frequency to have a value $f_s$=(baud rate×K)Hz where K is an integer. The data signal has a power A. Secondly, the pilots are phase locked onto the data signal. In the case of one pilot, the pilot frequency is $f_p$ Hz below the lowest or above the highest m-PFSK frequency ($D_{m-1}$). In the case of two pilots, the first pilot is at a frequency $f_{p1}$ Hz which (say) is $f_p$ Hz lower than the lowest m-pFSK frequency ($D_0$) The second pilot frequency is at a frequency $f_{p2}$ Hz which (say) is $f_p$ Hz higher than the highest m-PFSK frequency ($D_{m-1}$). In the case of three or more pilots the m-PFSK bandwidth may be broken down in to several parts, separated by pilots. The distance $f_p$ is chosen in a way that the orthogonality is retained, i.e. $f_p$=(baud rate×L) where L is an integer. The minimum $f_p$ spacing is given by $f_p=2V_h/\lambda$ Hz where $V_h$=maximum speed of the mobile receive and $\lambda$=the carrier wavelength. The pilots have the same power and their total power is B.

The total transmitted power is the sum of the data signal power A and the total pilot power B. The carrier to pilot power ratio (CPR), defined as A/B, indicates how the overall transmitted power is split between the data signal and the pilots. When the CPR value is very large the transmitted signal effectively reverts to a conventional m-ary FSK modulated signal. The CPR should therefore be kept to a low value.

Figure 10:
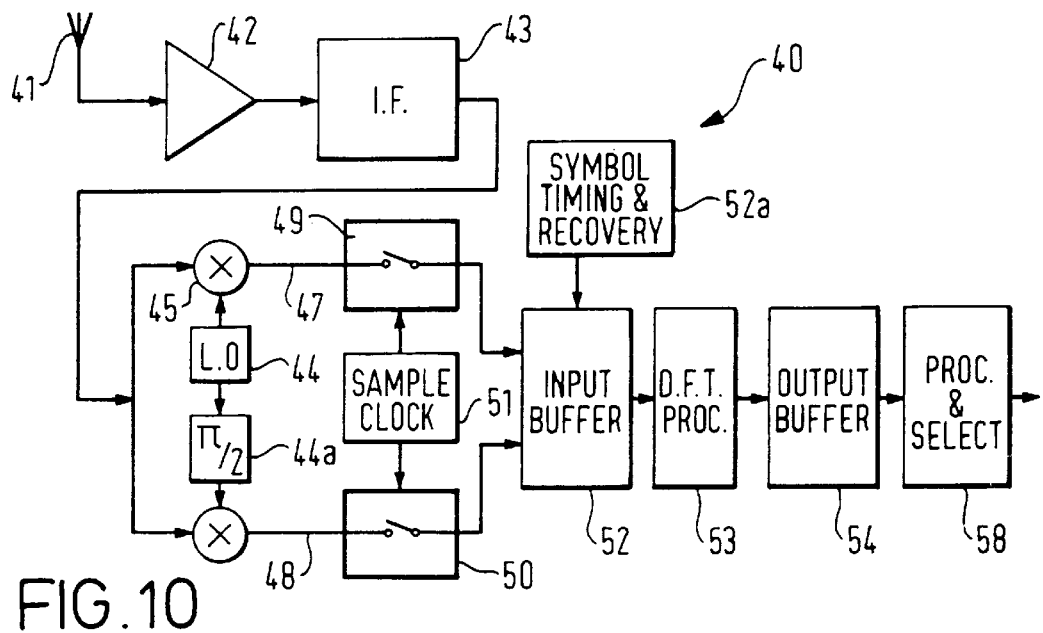
FIG. 10 is a schematic diagram of a circuit embodying the invention.

FIG. 10 of the accompanying drawings illustrates an electronic circuit 40 for receiving the transmitted signal and decoding the same to extract the data therefrom. The circuit 40 comprises an antenna 41 coupled to a low noise amplifier 42. Received signals output from the amplifier 42 are filtered and downconverted by an IF subsystem 43 together with a local oscillator 44, a phase delay 44a, mixers 45, 46 and low pass filters 47, 48 to provide a complex signal comprising two quadrature demodulated signals (so-called I and Q channels) each comprising the data signal (Dm) 25 to 35 and two pilot signals ($P_L$, $P_H$) 36, 37 on lines 47, 48. The I and Q channel signals on lines 47, 48 are input to respective sampling circuits 49, 50 (analogue to digital converters) which are controlled by a sampling clock 51 running at a sampling frequency Fs.

Together the sampling circuits 49, 50 provide a set of N complex signal samples at the sampling rate Fs for storage in an input buffer 52. Each tone is transmitted for a fixed predetermined time period. A symbol timing and recovery circuit 52 a ensures that the N samples are taken over that time period so that together they represent wholly the one tone only and do not represent part of the preceding or succeeding transmitted tone. The number N of complex samples taken for storage in the buffer 52 will, of course, depend on the total bandwidth of the transmitted signal and all pilot signals (e.g. B+2 $f_p$Hz) and on the specific hardware selected for use in the circuit 40. A set of 1024 samples will normally be acceptable.

Once all of the N samples have been stored in the input buffer 52 they are processed by a discrete fourier transform (DFT) processor 53 which converts the N complex samples from the time domain into a set of N complex samples in the frequency domain, by way of fast fourier transforms (FFTs). FFTs are well known in the art and require no further explanation herein. The N complex frequency samples produced by the DFT processor 53 are stored in an output buffer 54. Thus, the incoming signal is digitised and converted into digital representation of its spectrum.

Figure 11:
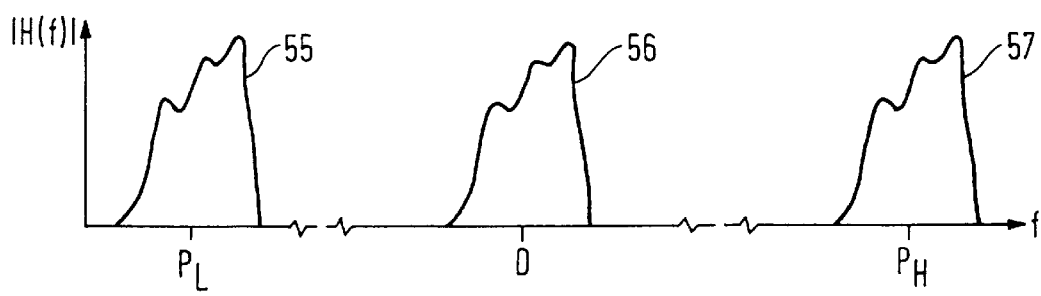
FIG. 11 is an m-PFSK spectrum of a transmitted signal subjected to multipath effects.

The frequency spectrum shown in FIG. 9 is an ideal representation of the spectrum of the signal as it is transmitted from the source. FIG. 11 of the accompanying drawings illustrates the spectrum of a signal as it might be received. During transmission the signal is distorted by multipath effects, doppler frequency shifts and oscillator instability frequency shifts and is further contaminated by noise. Within a limited bandwidth, known as the coherence bandwidth, all transmitted frequencies will be subjected to the same distortion and contamination. The coherence bandwidth is dependent on the frequency of the carrier signal; the higher the carrier frequency the narrower the bandwidth. At a carrier frequency of 1.5 GHz for example the coherence bandwidth is approximately 10 KHz. The frequencies of the two pilot signals should be selected to lie within the coherence bandwidth of the transmission system so that, as shown in FIG. 11, the envelopes 55, 56, 57 of the frequency samples of the lower pilot $P_L$, the data signal D and the upper pilot $P_H$ are substantially the same. A value of $f_s$=20 Hz and a value of $f_p$=80 Hz will give adequate spacing between tones and the pilot frequencies and will give an overall bandwidth of less than 1 KHz, well within the 10 KHz coherence bandwidth limit for a 1.5 GHz carrier.

Returning to FIG. 10, the N complex frequency samples in the output buffer 54 are processed by a processor 58 in the following manner. The frequency samples of the two pilot signals 55, 57 will have different phases and they are therefore phase-shifted to be in phase with each other. The phase shifted pilot signal samples are then added together to give a signal with less noise. Noise is random (assumed white and Gaussian) and therefore adding the phase shifted samples together will tend to improve the pilot signal to noise ratio by increasing the strength of the pilot signal components. In a less noisy environment one or more pilot signals of lower total power may be sufficient and in a more noisy environment a stronger pilot signal and/or more than one pilot signal may be required.

The summed pilot signals are cross-correlated with the remainder of the N frequency samples at each of the m frequencies or tones 25 to 35 in the band-width B. The processor 58 thus produces correlation number for each frequency or tone 25 to 35. Once a correlation number has been produced for each frequency 25 to 35, the frequency having the largest correlation number is selected as the frequency of the data signal D.

That is to say, the processor 58 produces a set of correlation numbers by processing the complex sample data, X, in the output buffer in accordance with the algorithm:

$$Si = \sum_{k=-R+\epsilon}^{R+\epsilon} \text{Re}\left\{ X_{b+i\cdot n+k} \cdot e^{j(b+i\cdot n)\frac{2\pi}{N}} \left( \sum_V X_{P_v+k} \cdot e^{jP_v\frac{2\pi}{N}} \right)^* \right\}$$

where i=0 to m−1, $S_i$=the correlation number for the ith frequency, v=no of pilots, b=($f_o/f_d$)+(N/2) where $f_o$=the lowest frequency in the bandwidth $f_d$=Fs/N and $F_s$=sampling rate, n=fs/$f_d$ where fs=Baud rate x k, and k is an integer, $P_v$=($f_P/f_d$)+(N/2) where $f_{P_v}$ is the frequency of the vth pilot, R=int{$(V_h/\lambda)/f_d$} where $V_h$=speed of the mobile receiver, $\lambda$=carrier wavelength, and int {. . . } is a function which rounds to the nearest integer, $\epsilon$=int{$f_e/f_d$}, where $f_e$=any carrier frequency offset, and (. . .)* is the complex conjugate.

The energy spread of the transmitted signal as a result of multipath effects is combined by the above process before a decision is made regarding the frequency tone of the data signal. As long as R and $\epsilon$ are known beforehand there is no loss in performance, i.e. no degradation in the decoded data, as a result of the energy spreading of the data signal. The phase of the received pilot samples will be noisy as will the phase of the received data signal. The phases are therefore not coherent, but are semi-coherent, which is acceptable because the average phase of each signal sample will be corrected by the average phase of the respective average phase of the pilot sample. That is to say the detection is semi-coherent because each signal sample is corrected by a different amount depending on the phase of the respective pilot sample. In order to accommodate the pilot signal or signals in the transmitted signal it is necessary to reduce the power of the data signal (as compared to the power at which it would be transmitted in a conventional m-FSK transmission using the same transmitter). In conventional m-FSK transmission and reception such a loss of power would result in an equal loss in performance. However, in the above-described method and circuit there is less of a loss in performance.

This method of sampling received signals, transforming the signal samples into the frequency domain, and cross correlating with the pilot signal or signals to identify the correct frequency is therefore inherently reliable. Unlike a PLL based decoder there is no feedback and consequently no delay or loss of data while the receiver locks on to a signal. The cross correlation enables a weak signal to be extracted from background noise with much greater accuracy than with a PLL based decoder and multipath effects are cancelled out.

The above described method and circuit are therefore well suited for use in a satellite paging system in which data is transmitted over a long distance at very slow data rates. Paging data would be transmitted from the satellite in the format described hereinabove with reference to FIG. 9 to be received by mobile pagers including the circuit described herein with reference to FIG. 10 together with other processing circuitry (not shown) made responsive to the decoded data. A system using the above discussed transmission parameter values would be well able to transmit data successfully to a mobile pager in a car travelling through a densely populated area at speeds in excess of 100 Km/H.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

We claim:
1. An electronic circuit comprising:
   a receiver for receiving a signal comprising a data signal at a frequency within a range of discrete frequency tones representing a predetermined range of digital values and a pilot signal;
   a transformer for transforming the received signal into a set of frequency samples of the pilot signal and a set of frequency samples of the data signal; and
   a correlator for correlating the set of frequency samples of the pilot signal with the set of frequency samples of the data signal at each of the discrete frequency tones in order to identify the discrete frequency tone to which the frequency of the data signal corresponds and thereby to identify the digital value represented by the data signal.

2. An electronic circuit as claimed in claim 1, wherein the pilot signal is at a frequency outside the frequency range.

3. An electronic circuit as claimed in claim 1, wherein the signal comprises a plurality of pilot signals, the transformer is arranged to transform the received signal into a set of frequency samples of each of the pilot signals, and the correlator is arranged to correlate the set of frequency samples of the pilot signals with the set of frequency samples of the data signal.

4. An electronic circuit as claimed in claim 3, wherein the correlator sums the sets of frequency samples of the pilot signals to produce a set of summed frequency samples, the correlator being arranged to correlate the set of summed frequency samples with the set of frequency samples of the data signal.

5. An electronic circuit as claimed in any preceding claim, wherein the receiver comprises a sampler for sampling the received signal at regular time intervals and for outputting a sequence of complex digital samples for transformation into said set of frequency samples by the transformer.

6. An electronic circuit as claimed in claim 5, wherein the transformer comprises means for effecting a discrete fourier transform to the sequence of complex digital samples in order to produce as a respective set of complex values the set of frequency samples of the or each pilot signal and the set of frequency samples of the data signal.

7. An electronic circuit as claimed in claim 6, wherein the discrete fourier transform is effected by way of a fast fourier transform.

8. An electronic circuit as claimed in claim 5, further comprising an input buffer to the transformer for holding the sequence of samples from the sampler and an output buffer for holding the sets of frequency samples from the transformer.

9. An electronic circuit as claimed in claim 1, wherein the correlator is arranged to produce for each discrete frequency tone a correlation coefficient and comprises a selector for selecting the frequency tone having the highest correlation coefficient.

10. An electronic circuit as claimed in claim 1, wherein the received signal comprises a carrier signal which is modulated by the data signal and the pilot signals and the receiver comprises a demodulator for demodulating the data signal and pilot signals from the carrier.

11. A radio pager for receiving data signal transmissions from a distant source, the pager comprising an electronic circuit as claimed in claim 1 for decoding received signals.

12. A radio pager as claimed in claim 11, wherein the electronic circuit is adapted to receive data signals transmitted from a satellite.

13. A method of decoding a signal comprising a data signal at a frequency within a range of discrete frequency tones representing a predetermined range of digital values and a pilot signal, the method comprising:
   transforming the signal into a set of frequency samples of the pilot signal and a set of frequency samples of the data signal; and
   correlating the set of frequency samples of the pilot signal with the set of frequency samples of the data signal at each of the discrete frequency tones in order to identify the discrete frequency tone to which the frequency of the data signal corresponds and thereby to identify the digital value represented by the data signal.

14. A method as claimed in claim 13, wherein the pilot signal is at a frequency outside the frequency range.

15. A method as claimed in claim 13, wherein the signal comprises a plurality of pilot signals, the method comprising transforming the received signal into a set of frequency samples of each of the pilot signals and correlating the set of frequency samples of the pilot signals with the set of frequency samples of the data signal.

16. A method as claimed in claim 15, further comprising summing the sets of frequency samples of the pilot signals to produce a set of summed frequency samples and correlating the set of summed frequency samples with the set of frequency samples of the data signal.

17. A method as claimed in any of claims 13 to 16, further comprising sampling the received signal at regular time intervals and outputting a sequence of complex digital samples for transformation into said sets of frequency samples by the transformer.

18. A method as claimed in claim 17, further comprising effecting a discrete fourier transform to the sequence of complex digital samples in order to produce as a respective set of complex values the set of frequency samples of the or each pilot signal and the set of frequency samples of the data signal.

19. A method as claimed in claim 18, wherein the discrete fourier transform is effected by way of a fast fourier transform.

20. A method as claimed in claim 13, further comprising producing for each discrete frequency slot a correlation coefficient; and selecting the frequency tone having the highest correlation coefficient.

21. A method as claimed in claim 13, wherein the received signal comprises a carrier signal which is modulated by the data and pilot signals, the method comprising demodulating the data and pilot signals from the carrier.

22. A method of paging, in which paging data is broadcast as a broadcast signal comprising a data signal at a frequency within a range of discrete frequency tones representing a predetermined range of digital values and at least one pilot signal, and in which the broadcast data received by paging units is decoded using the method as claimed in claim 13.

23. A method as claimed in claim 22, wherein the paging data is broadcast from a satellite.

24. An electronic circuit as claimed in claim 2, wherein the signal comprises a plurality of pilot signals, the transformer is arranged to transform the received signal into a set of frequency samples of each of the pilot signals, and the correlator is arranged to correlate the set of frequency samples of the pilot signals with the set of frequency samples of the data signal.

25. An electronic circuit as claimed in claim 24, wherein the correlator sums the sets of frequency samples of the pilot signals to produce a set of summed frequency samples, the correlator being arranged to correlate the set of summed frequency samples with the set of frequency samples of the data signal.

26. An electronic circuit as claimed in claim 24 or 25, wherein the receiver comprises a sampler for sampling the received signal at regular time intervals and for outputting a sequence of complex digital samples for transformation into said set of frequency samples by the transformer.

27. An electronic circuit as claimed in claim 26, wherein the transformer comprises means for effecting a discrete fourier transform to the sequence of complex digital samples in order to produce as a respective set of complex values the set of frequency samples of the or each pilot signal and the set of frequency samples of the data signal.

28. An electronic circuit as claimed in claim 27, wherein the discrete fourier transform is effected by way of a fast fourier transform.

29. An electronic circuit as claimed in claim 26, further comprising an input buffer to the transformer for holding the sequence of samples from the sampler and an output buffer for holding the sets of frequency samples from the transformer.

30. A method as claimed in claim 14, wherein the signal comprises a plurality of pilot signals, the method comprising transforming the received signal into a set of frequency samples of each of the pilot signals and correlating the set of frequency samples of the pilot signals with the set of frequency samples of the data signal.

31. A method as claimed in claim 30, further comprising summing the sets of frequency samples of the pilot signals to produce a set of summed frequency samples and correlating the set of summed frequency samples with the set of frequency samples of the data signal.

32. A method as claimed in claim 30 or 31, further comprising sampling the received signal at regular time intervals and outputting a sequence of complex digital samples for transformation into said sets of frequency samples by the transformer.

33. A method as claimed in claim 32, further comprising effecting a discrete fourier transform to the sequence of complex digital samples in order to produce as a respective set of complex values the set of frequency samples of the or each pilot signal and the set of frequency samples of the data signal.

34. A method as claimed in claim 33, wherein the discrete fourier transform is effected by way of a fast fourier transform.

35. A method as claimed in claim 30, further comprising producing for each discrete frequency slot a correlation coefficient; and selecting the frequency tone having the highest correlation coefficient.

* * * * *